United States Patent
Don et al.

(10) Patent No.: US 9,946,485 B1
(45) Date of Patent: Apr. 17, 2018

(54) EFFICIENT DATA MARKER REPRESENTATION

(71) Applicant: EMC IP HOLDING COMPANY LLC, Hopkinton, MA (US)

(72) Inventors: Arieh Don, Newton, MA (US); Slavik Neymer, Tel Aviv (IL); Jehuda Shemer, Kfar Saba (IL); Alexandra Solan, Tel Aviv (IL); Valerie Lotosh, Ramat Gan (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/386,042

(22) Filed: Dec. 21, 2016

(51) Int. Cl.
*G06F 3/06* (2006.01)

(52) U.S. Cl.
CPC ............ *G06F 3/064* (2013.01); *G06F 3/067* (2013.01); *G06F 3/0619* (2013.01)

(58) Field of Classification Search
CPC ......... G06F 3/064; G06F 3/0619; G06F 3/067
USPC ......... 711/156, 112, 114, 154, 162, 202, 206
See application file for complete search history.

(56) References Cited

U.S. PATENT DOCUMENTS

| | | | | |
|---|---|---|---|---|
| 6,502,178 B1* | 12/2002 | Olbrich | ................... | G06F 3/061 711/112 |
| 8,190,811 B2* | 5/2012 | Moon | ..................... | G06F 3/061 711/103 |
| 8,359,430 B1* | 1/2013 | Fair | ......................... | G06F 3/061 711/113 |
| 8,966,184 B2* | 2/2015 | Atkisson | ............. | G06F 12/0804 711/103 |
| 9,092,337 B2* | 7/2015 | Nellans | ............... | G06F 12/0804 |
| 9,104,599 B2* | 8/2015 | Atkisson | ............... | G06F 11/108 |
| 9,348,704 B2* | 5/2016 | Mizuno | ................. | G06F 3/0619 |
| 9,519,540 B2* | 12/2016 | Atkisson | ............... | G06F 11/108 |
| 9,678,874 B2* | 6/2017 | Nellans | ............... | G06F 12/0804 |

* cited by examiner

*Primary Examiner* — Stephen Elmore
(74) *Attorney, Agent, or Firm* — Anderson Gorecki LLP

(57) ABSTRACT

A changed block bitmap of a volume of storage is represented by a data marker that includes an offset to a first dirty block and an offset to a last dirty block. The blocks between the first and last dirty blocks are represented by contiguous clean block identifiers, contiguous dirty block identifiers, and contiguous mixed clean and dirty block identifiers. The contiguous clean block identifiers and contiguous dirty block identifiers use one or two bits to indicate identifier type. The remaining bits indicate a numerical count of contiguous clean or dirty blocks. The contiguous mixed clean and dirty block identifiers may use one bit per block to indicate change status. The data marker may be smaller than a corresponding changed block bitmap.

20 Claims, 4 Drawing Sheets

EFFICIENT DATA MARKER REPRESENTATION

BACKGROUND

The subject matter of this disclosure is generally related to computer networks in which a data storage system maintains data for multiple host servers and concurrent users. The host servers run data processing applications that may be referred to as host applications. The data storage system may include one or more storage arrays, each of which may include a plurality of interconnected computing nodes that manage access to application data stored on tangible data storage drives. The computing nodes may present one or more logical production volumes of storage to the host applications. The production volumes are backed by the tangible data storage drives. The host servers may access host application data by sending IOs with reference to the production volumes. The computing nodes of the storage array implement the IOs by accessing the tangible data storage drives. A production site storage system may be paired with a backup site storage system for failover and recovery.

SUMMARY

All examples, aspects and features mentioned in this document can be combined in any technically possible way.

In accordance with an aspect an apparatus comprises: a plurality of interconnected computing nodes, each of the computing nodes comprising at least one processor and non-transitory memory; a plurality of groups of data storage drives, each group of data storage drives connected with one of the computing nodes; first program code, stored on non-transitory memory, that maintains a logical storage volume comprising contiguous logical block addresses that map to non-contiguous addresses of the data storage drives; and second program code, stored on non-transitory memory, that generates a data marker that represents changes to the logical storage volume, the data marker comprising a first field that indicates an offset to a first dirty block and a second field that indicates an offset to a last dirty block. In some implementations the second program code generates the data marker with at least one bitmap field that represents contiguous clean blocks. In some implementations the bitmap field is two bytes in length and a most significant bit of the two bytes indicates that the bitmap field represents contiguous clean blocks. In some implementations fifteen bits following the most significant bit indicate a numerical count of contiguous clean blocks. In some implementations the second program code generates the data marker with at least one bitmap field that represents contiguous dirty blocks. In some implementations the bitmap field is two bytes in length and two most significant bits of the two bytes indicates that the bitmap field represents contiguous dirty blocks. In some implementations fourteen bits following the two most significant bits indicate a numerical count of contiguous dirty blocks. In some implementations the second program code generates the data marker with at least one bitmap field that represents contiguous mixed clean and dirty blocks. In some implementations the bitmap field is two bytes in length and two most significant bits of the two bytes indicates that the bitmap field represents contiguous mixed clean and dirty blocks. In some implementations fourteen bits following the two most significant bits each indicate change status of an individual block.

In accordance with an aspect a method comprises: in a storage array comprising a plurality of interconnected computing nodes, each of the computing nodes comprising at least one processor and non-transitory memory, and a plurality of groups of data storage drives, each group of data storage drives connected with one of the computing nodes: maintaining a logical storage volume comprising contiguous logical block addresses that map to non-contiguous addresses of the data storage drives; and generating a data marker that represents changes to the logical storage volume, comprising: generating a first field that indicates an offset to a first dirty block; and generating a second field that indicates an offset to a last dirty block. In some implementations generating the data marker comprises generating at least one bitmap field that represents contiguous clean blocks. Some implementations comprise generating the bitmap field with a length of two bytes and a most significant bit of the two bytes indicating that the bitmap field represents contiguous clean blocks. Some implementations comprise using fifteen bits following the most significant bit to indicate a numerical count of contiguous clean blocks. In some implementations generating the data marker comprises generating at least one bitmap field that represents contiguous dirty blocks. Some implementations comprise generating the bitmap field with a length of two bytes and two most significant bits of the two bytes indicating that the bitmap field represents contiguous dirty blocks. Some implementations comprise using fourteen bits following the two most significant bits to indicate a numerical count of contiguous dirty blocks. In some implementations generating the data marker comprises generating at least one bitmap field that represents contiguous mixed clean and dirty blocks. Some implementations comprise generating the bitmap field with a length of two bytes and two most significant bits of the two bytes indicating that the bitmap field represents contiguous mixed clean and dirty blocks.

In accordance with an aspect a method comprises: in a network comprising a data protection appliance and a storage array, the storage array comprising a plurality of interconnected computing nodes, each of the computing nodes comprising at least one processor and non-transitory memory, and a plurality of groups of data storage drives, each group of data storage drives connected with one of the computing nodes: maintaining a logical storage volume comprising contiguous logical block addresses that map to non-contiguous addresses of the data storage drives; and generating a data marker that represents changes to the logical storage volume, comprising: generating a first field that indicates an offset to a first dirty block; generating a second field that indicates an offset to a last dirty block; generating at least one bitmap field that represents contiguous clean blocks; and generating at least one bitmap field that represents contiguous dirty blocks; and sending the data marker from the storage array to the data protection appliance.

Other aspects, features and implementations may become apparent in view of the detailed description and figures.

DETAILED DESCRIPTION

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor hardware components. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features. For example, a virtual storage device could be based on multiple physical storage drives. The term "logic" is used to refer to special purpose physical circuit elements and software instructions that are stored on a non-transitory computer-readable medium and implemented by multi-purpose tangible processors.

Figure 1:
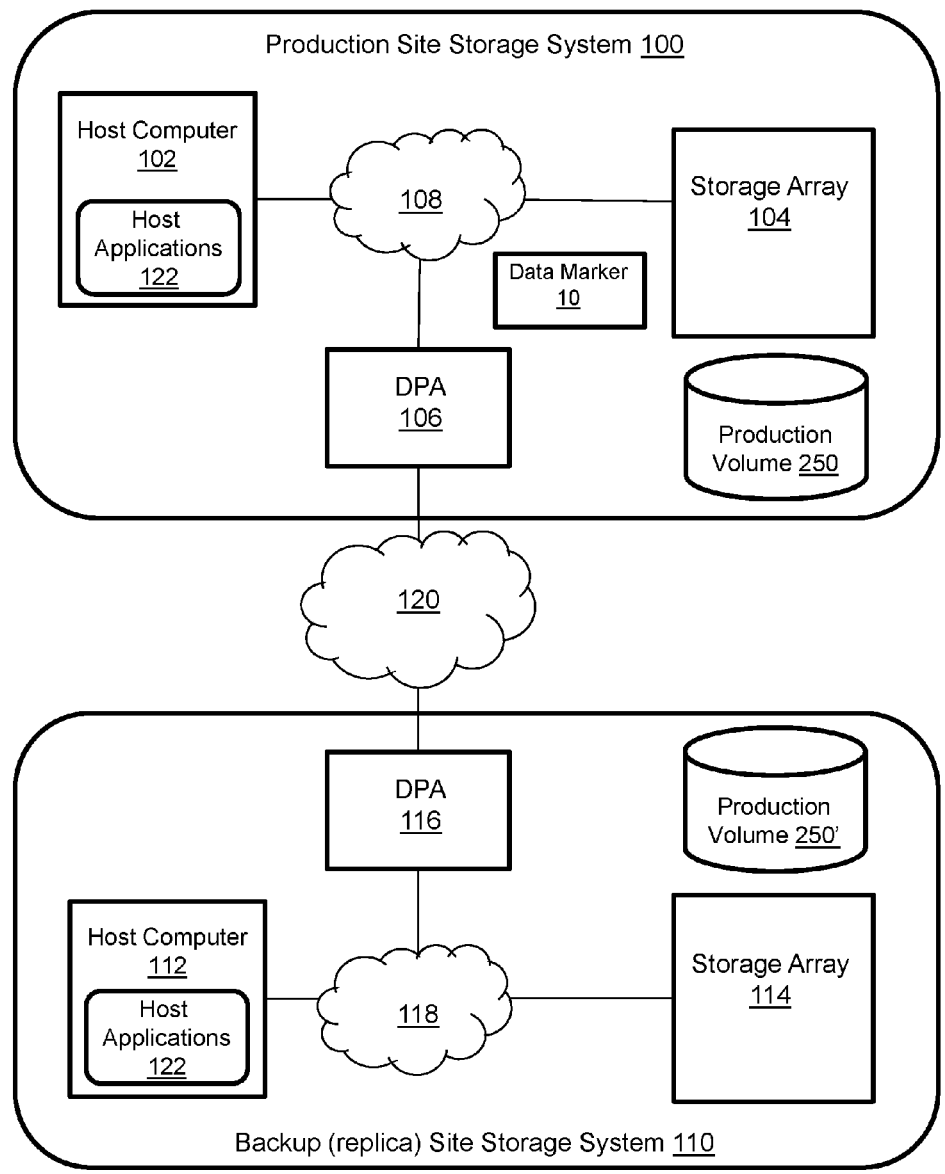
FIG. 1 illustrates a computer network in which a data marker provides a representation of a production volume change bitmap that can be efficiently transmitted via communications networks.

FIG. 1 illustrates a computer network in which a data marker 10 provides a representation of a production volume change bitmap that can be efficiently transmitted via communications networks. A production site data storage system 100 includes at least one host computer 102, at least one storage array 104 and a DPA (Data Protection Appliance) 106, each of which is interconnected via a network 108, for example and without limitation based on iSCSI or any other communication protocol. A backup (replica) site data storage system 110 includes at least one host computer 112, at least one storage array 114 and a DPA 116, each of which is interconnected via a network 118. The production site storage system 100 is connected to the backup site storage system 110 via a network 120. The production site storage system 100 may include a physical facility where the host computer 102 runs data processing applications that are referred to herein as host applications 122. The host applications write data to the storage array 104 and read data from the storage array 104. The backup site storage system 110 may be another physical facility where replicated production site data is stored by storage array 114 and the host applications 122 can be run on the host computer 112 for failover and restoration purposes. The backup site storage system 110 may be located at a remote site at a different geographical location or at the same geographical location as the production site storage system 100.

The DPAs 106, 116 may include a computer or cluster of computers responsible for data protection services including, inter alia, data replication. The host computers may each include a computer, cluster of computers or network of computers that run the host applications 122 that perform data processing and issue IO requests. A host computer is an "initiator," which means that the host computer can issue IO requests. A "target" is a node that replies to IO requests. An IO request is an input/output request that may be a Read IO request (sometimes referred to as a Read request or a Read) or a Write IO request (sometimes referred to as a Write request or a Write). The networks 106, 116 may include nodes that send and receive IOs and other requests, each node being an initiator or a target, or both an initiator and a target. The network 120 may include various network nodes, e.g. switches, routers, hubs, and other network devices, and may include one or more of the Internet, a WAN (wide area network), MAN (metropolitan area network) and LAN (local area network).

Figure 2:
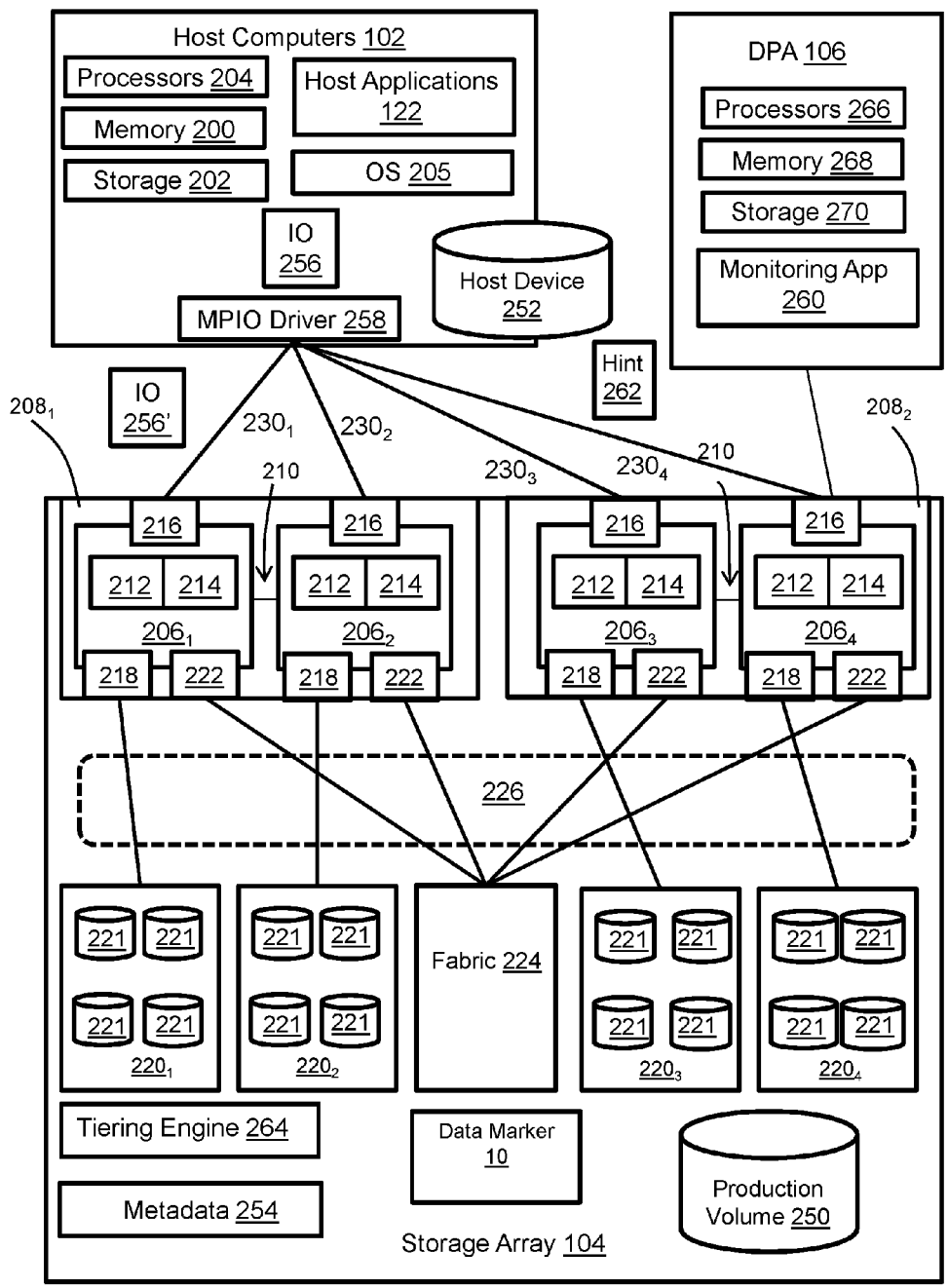
FIG. 2 illustrates aspects of IO servicing and use of the data marker in greater detail.

FIG. 2 illustrates aspects of IO servicing and use of the data marker 10 in greater detail. The host computer 102 may be a server with volatile memory 200, persistent storage 202, one or more tangible processors 204, and an OS (operating system) 205. The host computer might support virtual hosts running on virtual machines or containers, and although an external host computer is illustrated, internal hosts may be instantiated within the storage array. The storage array 104 includes a plurality of computing nodes $206_1$-$206_4$. Pairs of the computing nodes, e.g. ($206_1$, $206_2$) and ($206_3$, $206_4$), may be organized as storage engines $208_1$, $208_2$, respectively, for purposes of failover. The paired computing nodes of each storage engine may be directly interconnected by communication links 210. Each computing node includes at least one tangible multi-core processor 212 and a local cache 214. The local cache 214 may include, for example and without limitation, volatile memory components such as RAM (random access memory). Each computing node may include one or more FEs 216 (front-end directors, a.k.a. front end adapters) for communicating with the host computer 102. Each computing node $206_1$-$206_4$ may also include one or more BEs 218 (back end directors, a.k.a. back end adapters) for communicating with respective associated back end storage bays $220_1$-$220_4$, thereby enabling access to managed drives 221. The managed drives 221 may include tangible storage components of one or more technology types, for example and without limitation SSDs (solid state devices) such as flash, and HDDs (hard disk drives) such as SATA (Serial Advanced Technology Attachment) and FC (Fibre Channel). Each computing node may also include one or more CAs (channel directors, a.k.a. channel adapters) 222 for communicating with other computing nodes via an interconnecting fabric 224. Each computing node may allocate a portion or partition of its respective local cache 214 to a virtual shared "global" cache 226 that can be accessed by other computing nodes, e.g. via DMA (direct memory access) or RDMA (remote direct memory access).

Storage array 104 maintains data for the host applications 122 running on host computer 102, and the host applications use storage services that are provided by the storage array. For example, the host applications may write host application data to the storage array and read host application data from the storage array in order to perform various functions. Examples of host applications may include but are not limited to file servers, email servers, block servers and databases. A logical production volume 250 and a host device 252 are created to enable the storage array to provide storage services to the host applications. Without limitation, the production volume 250 may be referred to as a production device, production volume, production LUN or host LUN, where LUN (Logical Unit Number) is a number used to identify the logical storage volume in accordance with the SCSI (Small Computer System Interface) protocol. The host device 252 is a representation of the production volume 250.

The host device 252 and the production volume 250 represent abstraction layers between the managed drives 221 and the host applications 122. From the perspective of the host applications 122, the host device 252 is a single data storage device having a set of contiguous fixed-size LBAs (logical block addresses) on which data used by the host applications resides. However, the data used by the host applications may actually be maintained by the computing nodes $206_1$-$206_4$ at non-contiguous addresses on various different managed drives 221.

In order to service IOs from the host applications 122, the storage array 104 maintains metadata 254 that indicates, among various things, mappings between production volume 250 storage space and the locations of extents of host application data on the managed drives 221. In response to an IO 256 from one of the host applications to host device 252, an MPIO (Multi-Path Input-Output) driver 258 may determine whether the IO can be serviced by accessing the host computer memory 200. If that is not possible then the MPIO driver generates an IO 256' with reference to production volume 250 and selects a path on which to send the IO 256' to the storage array. There are multiple paths $230_1$-$230_4$ between the host computer 102 and the storage array 104, e.g. one path per FE 216. Each path may have a locally unique address that is known to the MPIO driver 258. However, the host application is not aware of the paths and addresses because it views the host device 252 as being available via a single logical path. The paths may be selected by the MPIO driver based on a wide variety of techniques and algorithms including, for context and without limitation, performance and load balancing. In the case of a read IO 256' the storage array uses the metadata 254 to locate the requested data, e.g. in the shared cache 226 or managed drives 221. If the requested data is not in the shared cache then it is temporarily copied into the shared cache from the managed drives and sent to the host application via one of the computing nodes. In the case of a write IO 256' the storage array creates new metadata that maps the production volume address with a location to which the data is written on the managed drives. The shared cache 226 may enable the production volume 250 to be reachable via all of the computing nodes and paths, although the storage array can be configured to limit use of certain paths to certain production volumes.

The managed drives 221 may be organized into different hierarchical performance tiers 0-n. For example, the managed drives may include SSDs at tier 0, Fibre Channel HDDs at tier 1, and SATA HDDs at tier n. Tier 0 is used to store extents of data that are "hot," e.g. likely to be accessed in the near future, for which various proxy indicators are known. Each extent may be associated with a contiguous area of storage, and the highest ranked extents are selected for storage at tier 0 because it exhibits the best access time. Tier 1 is used to store extents that are "warm." In particular, the next-highest ranked (after tier 0) extents of storage are selected for storage at tier 1. The remaining extents are stored at a tier lower than tier 1.

Tier selection may be partly or completely automated. One aspect of selecting a tier at which to store a particular extent of data is temporal likelihood of IO activity. Near term expected IO activity associated with an extent of data may justify promotion of the extent to a higher tier of storage. Conversely, near term expected IO inactivity associated with an extent can justify demotion of the extent to a lower tier of storage. A monitoring application 260 in the DPA 106 or elsewhere monitors data access (TO) activity on a per-extent basis over time and generates hints to prompt promotion and demotion of extents. For example, the monitoring application 260 may utilize statistical analysis algorithms to recognize data access patterns and generate a hint 262 that is sent to the storage array to prompt the storage array to promote certain extents to a higher storage tier if the calculations indicate that the data will be accessed in the near future or at some particular time (e.g., week, day, hour, minute etc.). The hint 262 may also prompt demotion of extents. The DPA may include processors 266, memory 268 and storage 270 to support running the monitoring application 260.

In order to help enable the monitoring application 260 to perform analysis on data access activity associated with host application data, the data marker 10 may be sent from the storage array to the DPA. The data marker indicates which extents of host application data on the production volume 250 have changed since some prior point in time, e.g. since a prior data marker representation was sent from the storage array to the DPA. As will be discussed below, the DPA may also or alternatively use the data marker for other functions, possibly including but not limited to maintaining the backup site storage system.

Referring again to FIG. 1, the DPAs 106, 116 perform various data protection services including data replication that enables failover from the production site storage system 100 to the backup site storage system 110. The DPAs are configured to act as both initiators and targets. In a normal (non-restoration) mode, DPA 106 is a source site DPA for production volume 250. Changes to the production volume 250 due to IO requests that are sent from host computer 102 to storage array 104 are represented by the data marker 10. DPA 106 receives the data marker 10 from storage array 104. DPA provides the data marker to DPA 116. DPA 116 may use the data marker to identify changed extents that need to be obtained in order to maintain consistency between production volume 250 and corresponding production volume 250' that is maintained by storage array 114. In other words, the changes to extents of production volume 250 may be identified from the data marker 10, obtained from storage array 104, and written to production volume 250' of storage array 114.

Because the data marker 10 may traverse one or more networks, e.g. network 108, network 120 and network 118, it may be desirable for the data marker to be smaller in size than a corresponding change bitmap. In one type of change bitmap each sequential bit represents a sequential chunk of production volume data, e.g. and without limitation 1 bit for each 128 KB. In context and without limitation, a bit value 0 may indicate a clean chunk and a bit value 1 may indicate a dirty chunk. It may be relatively inefficient to repeatedly transmit such a large bitmap across networks because many or most chunks will be unchanged and many bits may be required to represent those unchanged chunks. Data compression could be used to reduce the amount of data transmitted, but the cost of CPU cycles for compression and decompression is prohibitive.

Figure 3:
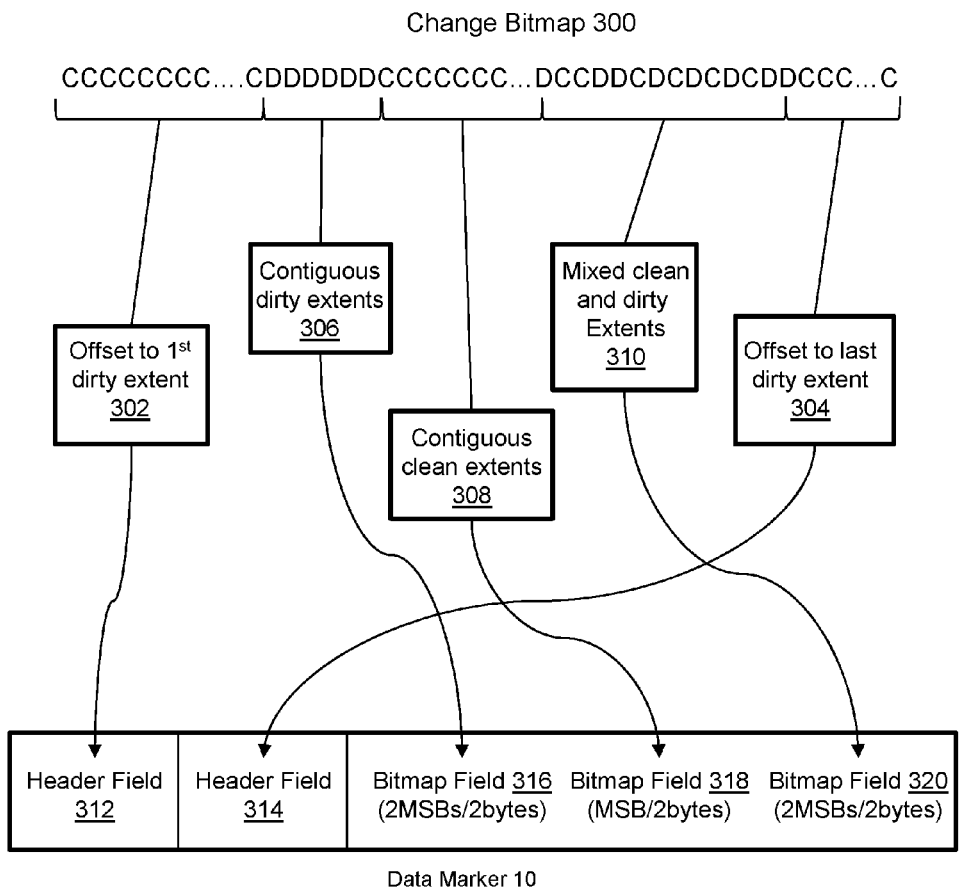
FIG. 3 illustrates an implementation of the data marker.

FIG. 3 illustrates one implementation of data marker 10. A change bitmap 300 represents the change status of extents of the production volume 250 (FIGS. 1 and 2). In the illustrated figure a "C" indicates a "clean" extent, i.e. an extent that has not changed, and a "D" indicates a "dirty" extent, i.e. an extent that has changed. In practice, a logic 1 or logic 0 bit would be used to represent clean and dirty extents. The data marker 10 representation of the bitmap includes a leading offset 302 to a first dirty extent, a trailing offset 304 to a last dirty extent, zero or more contiguous dirty extents identifiers 306, zero or more contiguous clean extents identifiers 308, and zero or more mixed clean/dirty extents identifiers 310. In other words, although only one example of each of the contiguous dirty extents identifier 306, contiguous clean extents identifier 308, and mixed clean/dirty extents identifier 310 are shown, any number of each of those identifiers could be used and in any combination with other identifiers. The identifiers provide an efficient representation of the change bitmap 300.

The extent size may be selected as an implementation detail. For context and without limitation each extent will hereafter be described as being a single block, where 1 block may be 8 sectors and 1 sector may be 512 bytes for example and without limitation. However, any block size may be selected so the terms "block" and "extent" may be used interchangeably. Each entry in bitmap 300 would thus represent the change status of a single block at a particular LBA (Logical Block Address) of the production volume, where the LBAs of the bitmap are contiguously ordered. The leading offset 302 may indicate the LBA of the first dirty block in bitmap 300. All blocks before the first dirty block are clean. The trailing offset 304 may indicate the LBA of the last dirty block in bitmap 300. All blocks after the last dirty block are clean. The contiguous dirty extent identifier 306 would indicate the numerical size of a group of contiguous LBAs that contain dirty blocks. The contiguous clean extent identifier 308 would indicate the numerical size of a group of contiguous LBAs that contain clean blocks. The mixed clean/dirty extents identifier 310 may include a SDDF (Self-Describing Data Format) that uses individual bits to indicate change status of individual blocks at contiguous LBAs.

In one implementation the data marker 10 includes header fields with the leading and trailing offsets, and a bitmap payload with a combination of zero or more of each of the contiguous clean extent identifiers, contiguous dirty extent identifiers and mixed clean/dirty extent identifiers in bitmap fields. A header field 312 contains the leading offset 302. The header field 312 may be 8 bytes in length. A value 0xffffffffffffffff may be indicative of an entirely clean bitmap 300. A header field 314 contains the trailing offset 304. The header field 314 may be 8 bytes in length. A value 0xffffffffffffffff may be indicative of an entirely clean bitmap 300. The bitmap payload may include a bitmap field 316 with a contiguous dirty extents identifier, a bitmap field 318 with a contiguous clean extents identifier, and a bitmap field 320 with a mixed clean/dirty extents identifier. Each bitmap field may have a length of 2 bytes.

The MSB (Most Significant Bit) or the two MSBs of the 2 bytes of each bitmap field may be used to represent the identifier type. For example and without limitation the first MSB may be used to indicate a contiguous clean extents (block) identifier 308 in bitmap field 318. In one implementation, for context and without limitation, a MSB 0 indicates a contiguous clean extents identifier. The remaining 15 bits of the 2 bytes represent the number of contiguous clean extents. For example, 0x0042 (00000000 01000010b) may indicate that the next 66 blocks (of 128 KB) from a particular LBA are clean. The 2 byte bitmap entry can indicate the presence of up to 4 GB of contiguous clean data in the specifically described example. The 2 MSBs may be used to represent the contiguous dirty extents identifier and the or mixed/clean dirty extents identifier. In one implementation, for context and without limitation, the two MSBs having a value 10 indicates a contiguous dirty extents identifier. The remaining 14 bits represent the number of dirty extents. For example, 0x8230 (10000010 00110000b) may indicate that the next 560 blocks from a particular LBA are dirty. The 2 byte entry can indicate the presence of up to 2 GB of contiguous dirty data in the specifically described example. The two MSBs having a value 11 indicates that the remaining 14 bits represent mixed clean/dirty extents. Each of the remaining 14 bits may represent the status of a particular extent. For example, 0xc1e0 (11000001 11100000b) may indicate that the next 5 blocks are clean, the following 4 blocks are dirty, and the following 5 blocks are clean, starting at a particular LBA. The 2-bytes-long mixed clean/dirty extents identifier can indicate change status of up to 1.75 MB of data in the specifically described example.

Figure 4:
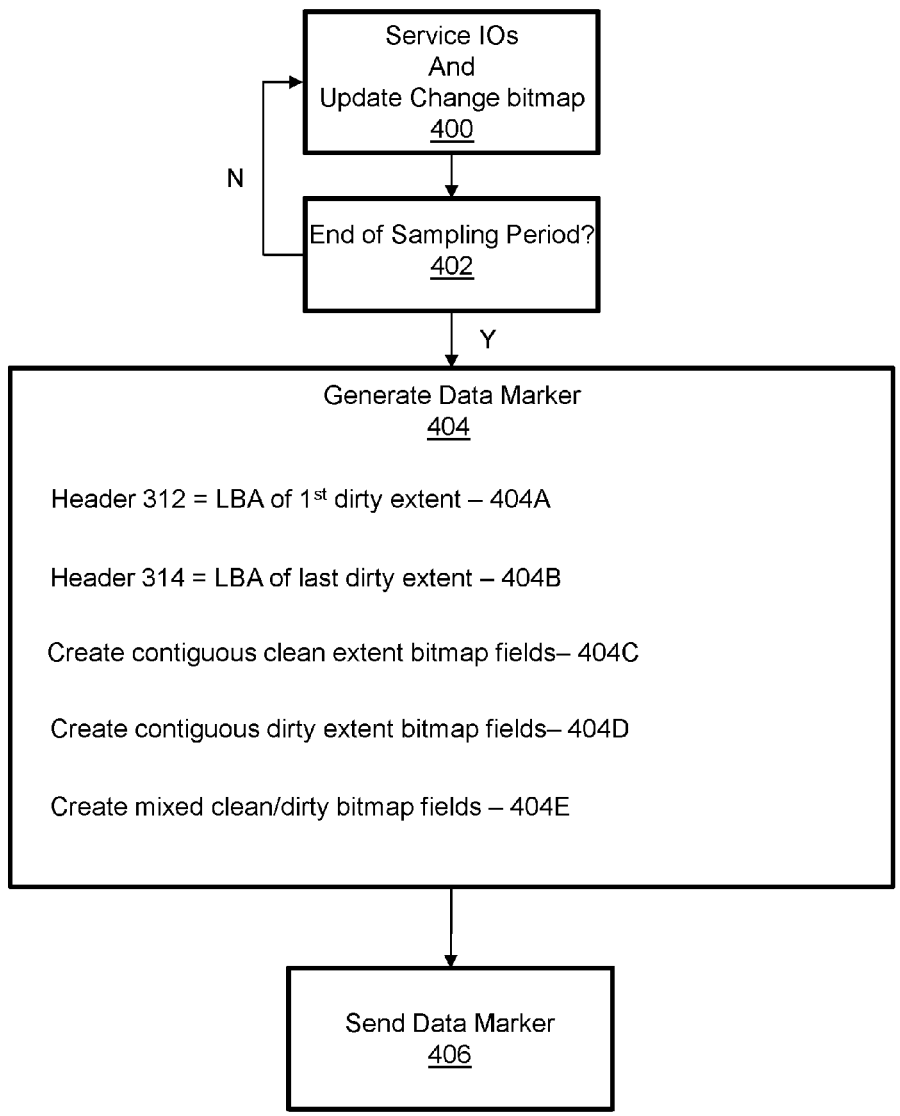
FIG. 4 illustrates processes associated with data marker generation and use.

FIG. 4 illustrates a method of data marker generation and use. The storage array services IOs and updates the change bitmap between sampling points of a sample period as indicated in block 400. The change bitmap may use single bits to represent the change status of fixed-size extents as explained above. For example, each bit may represent a block at a LBA of the production volume. When the end of the sampling period is reached, as determined in block 402, the data marker is generated as indicated in block 404. Data marker generation may be implemented in a variety of different ways but in one implementation header 312 is generated in a first procedure 404A and header 314 is generated in a second procedure 404B. Zero or more contiguous clean extents bitmap fields are generated in procedure 404C. Contiguous clean extents fields are used when the representation is more efficient than using mixed clean/dirty bitmap fields. For example, a contiguous clean extents bitmap field would not typically be used to represent two contiguous clean blocks. Zero or more contiguous dirty extents bitmap fields are generated in procedure 404D. Contiguous dirty extents fields are used when the representation is more efficient than using mixed clean/dirty bitmap fields. The remaining blocks are then represented by generating zero or more mixed clean/dirty bitmap fields in procedure 404E. The contiguous clean, contiguous dirty and mixed clean/dirty bitmap fields generated in procedures 404C, 404D and 404E may occur in any numbers and in any combination and in any order. The data marker is then distributed to one or more nodes such as DPAs that are reachable via one or more networks. The DPAs or other nodes may then use the data marker as already discussed above.

The implementation of the data marker described above takes advantage of the likelihood that most of the production volume data will be unchanged between any two consecutive temporal sampling points, e.g. when hints are generated. More particularly, the leading offset and trailing offset trim the size of the bitmap, and the contiguous clean extents bitmap field using a single MSB as an indicator helps to efficiently represent the unchanged data. The implementation also takes advantage of the likelihood that changed extents will be contiguous. Both encoding and decoding of the payload are efficient. Encoding may require only a single pass over the changed extent bitmap. The data marker also provides an indication of "hot" areas where data is changing. This may facilitate tracking and statistic generation, e.g. percent of changes between two sampling periods and locality of changes. The storage array can use "hot area" knowledge in order to select and implement a destage delay policy. Hot areas will benefit from a longer delay before destage to disk, whereas cold areas could be destaged immediately.

If a production volume is highly utilized then the data marker might be less efficient to transmit than the change bitmap. The amount of changes may be monitored and either the change bitmap or the data marker may be used depending on which one will be most efficient to transmit across the network.

A number of features, aspects, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
a plurality of interconnected computing nodes, each of the computing nodes comprising at least one processor and non-transitory memory;
a plurality of groups of data storage drives, each group of data storage drives connected with one of the computing nodes;
first program code, stored on non-transitory memory, that maintains a logical storage volume comprising contiguous logical block addresses that map to non-contiguous addresses of the data storage drives; and
second program code, stored on non-transitory memory, that generates a data marker that represents changes to the logical storage volume, the data marker comprising a first field that indicates an offset to a first dirty block and a second field that indicates an offset to a last dirty block.

2. The apparatus of claim 1 wherein the second program code generates the data marker with at least one bitmap field that represents contiguous clean blocks.

3. The apparatus of claim 2 wherein the bitmap field is two bytes in length and a most significant bit of the two bytes indicates that the bitmap field represents contiguous clean blocks.

4. The apparatus of claim 3 wherein fifteen bits following the most significant bit indicate a numerical count of contiguous clean blocks.

5. The apparatus of claim 1 wherein the second program code generates the data marker with at least one bitmap field that represents contiguous dirty blocks.

6. The apparatus of claim 5 wherein the bitmap field is two bytes in length and two most significant bits of the two bytes indicates that the bitmap field represents contiguous dirty blocks.

7. The apparatus of claim 6 wherein fourteen bits following the two most significant bits indicate a numerical count of contiguous dirty blocks.

8. The apparatus of claim 1 wherein the second program code generates the data marker with at least one bitmap field that represents contiguous mixed clean and dirty blocks.

9. The apparatus of claim 8 wherein the bitmap field is two bytes in length and two most significant bits of the two bytes indicates that the bitmap field represents contiguous mixed clean and dirty blocks.

10. The apparatus of claim 9 wherein fourteen bits following the two most significant bits each indicate change status of an individual block.

11. A method comprising:
in a storage array comprising a plurality of interconnected computing nodes, each of the computing nodes comprising at least one processor and non-transitory memory, and a plurality of groups of data storage drives, each group of data storage drives connected with one of the computing nodes:
maintaining a logical storage volume comprising contiguous logical block addresses that map to non-contiguous addresses of the data storage drives; and
generating a data marker that represents changes to the logical storage volume, comprising:
generating a first field that indicates an offset to a first dirty block; and
generating a second field that indicates an offset to a last dirty block.

12. The method of claim 11 wherein generating the data marker comprises generating at least one bitmap field that represents contiguous clean blocks.

13. The method of claim 12 comprising generating the bitmap field with a length of two bytes and a most significant bit of the two bytes indicating that the bitmap field represents contiguous clean blocks.

14. The method of claim 13 comprising using fifteen bits following the most significant bit to indicate a numerical count of contiguous clean blocks.

15. The method of claim 11 wherein generating the data marker comprises generating at least one bitmap field that represents contiguous dirty blocks.

16. The method of claim 15 comprising generating the bitmap field with a length of two bytes and two most significant bits of the two bytes indicating that the bitmap field represents contiguous dirty blocks.

17. The method of claim 16 comprising using fourteen bits following the two most significant bits to indicate a numerical count of contiguous dirty blocks.

18. The method of claim 11 wherein generating the data marker comprises generating at least one bitmap field that represents contiguous mixed clean and dirty blocks.

19. The method of claim 18 comprising generating the bitmap field with a length of two bytes and two most significant bits of the two bytes indicating that the bitmap field represents contiguous mixed clean and dirty blocks.

20. A method comprising:
in a network comprising a data protection appliance and a storage array, the storage array comprising a plurality of interconnected computing nodes, each of the computing nodes comprising at least one processor and non-transitory memory, and a plurality of groups of data storage drives, each group of data storage drives connected with one of the computing nodes:
maintaining a logical storage volume comprising contiguous logical block addresses that map to non-contiguous addresses of the data storage drives; and
generating a data marker that represents changes to the logical storage volume, comprising:
generating a first field that indicates an offset to a first dirty block;
generating a second field that indicates an offset to a last dirty block;
generating at least one bitmap field that represents contiguous clean blocks; and
generating at least one bitmap field that represents contiguous dirty blocks; and
sending the data marker from the storage array to the data protection appliance.

* * * * *